R. W. SNYDER

MACHINE FOR SHAPING TIRES AND INSERTING AIRBAGS THEREIN

May 2, 1933. Re. 18,812

Original Filed Dec. 15, 1927

Inventor

Robert W. Snyder,

By R. S. Trogner

Attorney

BEST AVAILABLE COPY

Reissued May 2, 1933

Re. 18,812

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

MACHINE FOR SHAPING TIRES AND INSERTING AIR BAGS THEREIN

Original No. 1,732,778, dated October 22, 1929, Serial No. 240,170, filed December 15, 1927. Application for reissue filed October 19, 1931. Serial No. 569,816.

My invention relates to apparatus for shaping pneumatic tires, and it has particular relation to apparatus in which pneumatic tires are shaped by fluid pressure, acting against the tire walls.

One object of my invention is to provide an apparatus that will both shape so-called "flat-built" tire bands and insert airbags therein in a single cycle of operation.

Another object of my invention is to provide a novel mechanism for shaping a tire band.

This application is a continuation in part of my co-pending application, Serial No. 219,892, filed September 16, 1927.

One method of manufacturing pneumatic tires consists in fabricating the tire in the form of a cylindrical or "flat-built" band, subsequently expanding the tread portion into the toroidal form requisite to pneumatic tires, then inserting an expansible airbag therein and subsequently vulcanizing the tire in a mold.

Various types of apparatus have heretofore been employed for performing the shaping operation. These types of apparatus, however, were only adapted to expand the tire, the insertion of the airbag being accomplished in a subsequent step, thereby necessitating an excessive amount of manual labor.

In a machine constructed in accordance with the provisions of my invention, mechanism is provided for inserting a collapsed airbag into the tire while it is still in the shaping machine, and it is there allowed to expand into its proper position due to its natural resiliency, thereby obviating the above-mentioned disadvantages.

Figure 2:
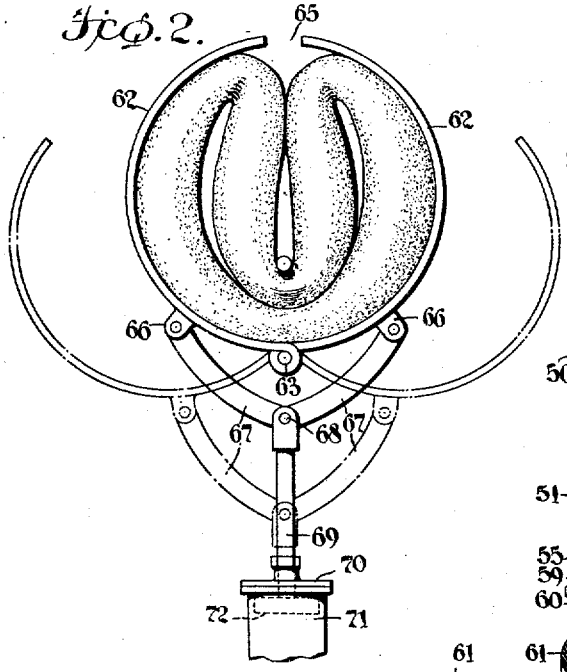
Figure 1:
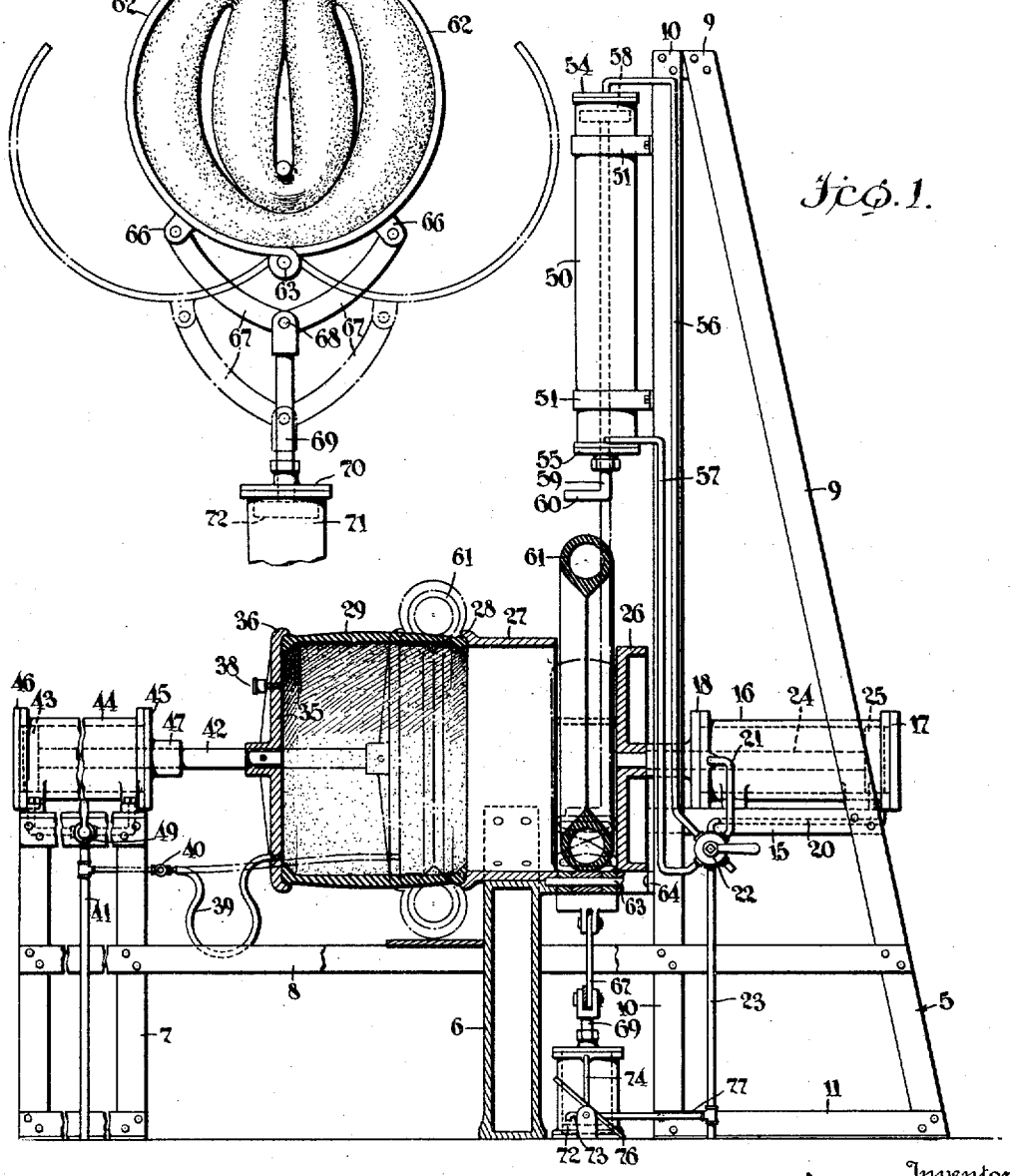

For a better understanding of my invention, reference may now be had to the accompanying drawing, forming a part of this specification, of which Fig. 1 is a fragmentary view, partially in elevation and partially in cross-section, of a machine embodying my invention; and Fig. 2 is a fragmentary, side-elevational view on a larger scale, showing the mechanism for holding an airbag collapsed.

In practising my invention, I provide a supporting frame-work comprising upright frame members 5, 6 and 7, joined together by means of connection bars 8. The support 5 consists of upwardly converging upright members 9 and 10, secured directly together at their upper ends and connected at their lower ends by a cross bar 11. A platform 15 is secured to members 9 and 10 intermediately of their ends, and a horizontally disposed cylinder 16 having cylinder heads 17 and 18 is mounted thereon. Compression fluid conduits 20 and 21 lead from the ends of the cylinder and are connected to a multi-passage valve 22 that controls the flow of fluid under pressure from a main 23.

A piston rod 24 secured to a piston head 25 slidably mounted in the cylinder 16 extends outwardly through the cylinder head 21 and is provided at its outer end with an airbag-engaging head 26 that is positioned, when extended, within an open-ended airbag guiding cylinder 27 placed in coaxial alignment therewith upon the support 6. Both the outer periphery of the head 26 and the inner periphery of the cylinder 27 are machined to provide a compression fluid-tight fit therebetween. The forward end of the cylinder is flared to provide a seat 28 for the outer periphery of a bead of a flat-built tire casing 29.

A movable head 35, positioned in coaxial alignment with the cylinder 27, has a bead-engaging portion 36 corresponding to the member 26. The head is also provided with an escape valve 38 and a flexible inlet conduit 39, which is provided with a valve 40 and is connected to a compression fluid main 41.

The head 35 is supported at one end of a piston rod 42 attached at its other end to a piston head 43 slidably mounted in a compression cylinder 44 mounted upon the support 7. The ends of the cylinder are closed by cylinder heads 45 and 46, the former of which is provided with a stuffing box 47 for the piston rod 42. Compression fluid conduits 48 connect the ends of the cylinder to the fluid main 41, and the flow of fluid thereto is controlled by the multi-passage valve 49.

BEST AVAILABLE COPY

The upper ends of the members 9 and 10 support a relatively long cylinder 50 of comparatively small diameter, that is attached thereto in vertical alignment with the space between cylinder 27 and the head 26 by means of collars 51, and whose ends are closed by cylinder heads 54 and 55, and which communicate with the valve 22 by means of conduits 56 and 57, respectively.

A piston head 58 slidably mounted within the cylinder is provided with a piston rod 59 extending downwardly through the lower cylinder head 55 and having an angularly disposed airbag collapsing foot portion 60 upon its lower end that engages an airbag 61 positioned between the head 26 and the end of the cylinder 27, preparatory to being collapsed.

Ring segments 62 that enclose the airbag 61 when the latter is collapsed are hinged together by means of a pin 63 having one end secured in an opening in the support 6, and the other end secured in an opening formed in a bar 64 secured between the members 10. The segments when closed do not quite meet at their free ends, thereby providing an opening 65 through which the foot 60 may be retracted.

The rings are provided with outwardly projecting lugs 66, pivotally attached to curved toggle links 67, which are pivoted at their point of union 68 to a vertical piston rod 69, extending through the head 70 of a cylinder 71 and actuated by a piston head 72 within the cylinder. Fluid under pressure is admitted selectively to either end of the cylinder by means of conduits 73 and 74 having a common valve 75 controlled by a treadle 76 and communicating with a fluid main 77.

In operating the machine embodying my invention, the airbag-engaging head 26 and the movable head 35 are retracted from the ends of the cylinder 27. The piston head 58 is also retracted to its extreme upper position within the cylinder 50 so that the airbag-engaging foot 60 is positioned above an airbag 61 that is placed between the opening ring segments 62 and in alignment with the cylinder 27. The tire casing 29, in the form of a cylindrical band, is next positioned between the flanges 28 and 36 of the cylinder 27, and the movable head 35.

By actuating the piston head 58 downwardly, the airbag is collapsed to the position indicated in Fig. 2. At the same time, the piston head 72 is actuated upwardly to cause the toggle links 67 to close the ring segments, thereby enclosing the airbag. The foot 60 is then retracted through the opening 65 between the ring segments, thereby leaving the airbag in collapsed position and in alignment with the cylinder 27. The airbag is thrust forward by actuating the airbag-engaging head 26, and is positioned adjacent the tire bead that is positioned upon the cylinder. A fluid-tight chamber is formed by the head 26, the tire casing 29 and the movable head or disc 35. Fluid under pressure is admitted to the chamber thus formed by opening the valve 40 in the line 39, thereby expanding the tread portion of the tire and at the same time, the head 35 is actuated forwardly by admitting fluid under pressure to the rear end of the cylinder 46. During the expansion of the tire, the bead portions thereof are moved together to the position indicated by dotted lines in Fig. 1. The airbag is then thrust forward to a position between the tire beads and is there allowed to expand and assume a position within the tire casing.

From the foregoing description it will be apparent that I have provided a mechanism whereby airbags may be collapsed and positioned within a tire casing entirely by mechanical means, thus obviating a great deal of arduous labor upon the part of the operator.

Although I have illustrated but one form which my invention may assume and described in detail but a single application thereof, it will be apparent to those skilled in the art that the invention is not so limited but that various minor modifications may be made therein without departing from the spirit of the invention or from the scope of the appended claims.

What I claim is:

1. A combined airbag-inserting and tire-shaping machine comprising means for engaging the outer peripheries of the beads of a "flat-built" tire casing, means for moving an airbag from a position without to a position within the casing, and means for pneumatically shaping the casing.

2. A combined airbag-inserting and tire-casing-shaping machine comprising means for engaging the beads of a tire casing, means for collapsing an airbag, means for moving the collapsed bag from a position without to a position within the inner periphery of the tire casing, and means for pneumatically shaping the tread portion of the tire.

3. A combined airbag-inserting and tire-shaping machine comprising a movable head having means for engaging the outer periphery of one bead of a "flat-built" casing, a cylinder having means adapted for engaging the outer periphery of the other bead positioned adjacent the movable head, means for relatively moving the head and cylinder axially of each other, a piston slidably mounted within the cylinder to move a collapsed airbag to a position within the inner periphery of the casing, and means to shape the tread portion of the casing before the airbag has been positioned therein.

4. A combined airbag-inserting and tire-shaping machine comprising a movable head

BEST AVAILABLE COPY having a flange adapted to engage one bead of a casing, a cylinder positioned in axial alignment with the head and having a bead-engaging flange for engaging the other bead of the tire, a piston movable within the cylinder, pneumatic means for collapsing an airbag before it is advanced by the piston, means for reciprocating the piston, whereby to advance the bag to a position within the inner periphery of the casing, and means to shape the tread portion of the casing.

5. A combined airbag-inserting and tire-shaping machine comprising a movable head having a flange for engaging the outer periphery of one bead of a "flat-built" tire casing, a cylinder having a flange for engaging the outer periphery of the other bead of the casing, means for admitting compressed fluid into the cylinder, and means for advancing a collapsed airbag within the inner periphery of the casing.

6. A combined airbag-inserting and tire-shaping machine comprising a movable head having a flange for engaging one bead of a pneumatic tire casing, pneumatic means for moving the head, a cylinder having a flange for engaging the other bead of the casing, means for admitting compressed air into the cylinder, means for advancing a collapsed airbag to a position within the inner periphery of the casing, means for collapsing the airbag for insertion within the cylinder, and means for shaping the tire casing.

7. A device for inserting an airbag within a pneumatic tire casing and for expanding the tread portion thereof comprising a movable head having a flange for engaging the outer periphery of one bead of a pneumatic casing, a cylinder positioned in axial alignment with the head and having a flange for engaging the outer periphery of the other bead of the casing, a piston reciprocable in the cylinder and movable beyond the end of the latter to permit the airbag to be inserted within the cylinder, means for operating the piston, and means for shaping the tire casing.

8. A device for successively inserting an airbag into a pneumatic tire casing and expanding the tread portion of the latter comprising a cylinder having a piston therein, a piston rod secured to the piston and extending outwardly from the cylinder, a movable head secured to the piston rod having a flange for engaging one bead of a casing, a second cylinder having both of its ends open positioned in axial alignment with the movable head, a piston head operable within the cylinder, and removable therefrom to permit the insertion of an airbag within the cylinder, means for collapsing the bag before it is inserted in the cylinder, and means for moving the piston.

9. A device for inserting an airbag into a pneumatic tire casing and for expanding the thread portion of the latter comprising a cylinder having a flange for engaging a bead of a casing, an airbag collapsing mechanism positioned adjacent the rear end of the cylinder, means for advancing a collapsed airbag from the collapsing mechanism to position within the inner periphery of the tire, and means for shaping the tread portion of the tire.

10. A machine for inserting airbags into flat-built pneumatic tire casings and for shaping the tread portion thereof comprising means for engaging the outer peripheries of the beads of "flat-built" tire bands, means for advancing an airbag from a position without to a position within the inner periphery of the casing and means for shaping the tread portion thereof.

11. A machine for inserting an airbag into a pneumatic tire casing and for expanding the tread portion thereof comprising a cylinder provided with a seat at one end for engaging one bead of a casing, means for engaging the other bead of the casing, an airbag-collapsing mechanism positioned at the other end of the cylinder, means associated with the collapsing mechanism adapted to maintain the bag in collapsed position until it can be moved within the cylinder, and means for moving the bag from the latter mechanism through the cylinder and into substantially co-planar alignment with the beads of the tire mounted upon the end of the cylinder, and means to shape the tread portion of the latter.

12. Mechanism for inserting an airbag into a pneumatic tire casing and expanding the tread portion thereof comprising a cylinder provided with a seat for a bead of a tire casing upon one end thereof, means for moving the other bead of the tire toward the first mentioned bead, an airbag collapsing mechanism positioned at the other end of the cylinder, ring segments hinged together for receiving an uncollapsed airbag, means to move the segments together to enclose the airbag when collapsed, means to move the collapsed airbag from the segments through the cylinder and into a position between the tire beads, and means to shape the tread portion of the latter.

13. A machine of the class described including, in combination, means for shaping a "flat-built" tire casing by differential fluid pressure applied directly to the casing, and mechanism operable to collapse an airbag or its equivalent, and thereafter insert the collapsed airbag into the shaped casing and allow it to expand therein.

14. A machine of the class described including in combination, means for shaping a "flat-built" tire casing by differential fluid pressure applied directly to the casing, and mechanism operable to collapse an airbag or its equivalent, and thereafter move the col-

BEST AVAILABLE COPY lapsed airbag into the shaped casing at one side thereof and allow it to expand therein.

15. A machine of the class described including, in combination, means for supporting a "flat-built" tire casing and forming therewith an interior fluid-tight chamber, means for creating in said chamber super-atmospheric pressure sufficient to shape the casing, means for collapsing an airbag or its equivalent, and means, including a member forming part of the fluid-tight chamber, for effecting the insertion of the collapsed airbag into the shaped casing and allow it to expand therein.

16. A machine of the class described including, in combination, means for supporting a "flat-built" tire casing and forming therewith an interior fluid-tight chamber, means for creating in said chamber super-atmospheric pressure sufficient to shape the casing, means for collapsing an airbag or its equivalent at one side of the tire casing, and means, including a member forming part of the fluid-tight chamber, for effecting the insertion of the collapsed airbag into the shaped casing and allow it to expand therein.

17. A machine of the class described including, in combination, means for supporting a "flat-built" tire casing and cooperating therewith to form a fluid-tight chamber, a holder adapted to have sealed communication with said chamber, means for creating within said chamber super-atmospheric pressure sufficient to shape the tire casing, and mechanism for positioning a collapsed airbag or its equivalent within said holder and later transferring it therefrom into the shaped casing.

18. A machine of the class described including, in combination, means for supporting a "flat-built" tire casing, and cooperating therewith to form a fluid-tight chamber, a holder located at one side of the tire casing and adapted to have sealed communication with said chamber, means for creating within said chamber super-atmospheric pressure sufficient to shape the tire casing, and mechanism for positioning a collapsed airbag or its equivalent within said holder and later transferring it therefrom into the shaped casing through one side thereof.

19. A machine of the class described including, in combination, relatively movable pressing members adapted to make substantial fluid-tight joints with the two edges of a "flat-built" tire casing and cooperating therewith to form a substantially hermetically sealed chamber, means for creating within said chamber super-atmospheric pressure sufficient to shape the casing, one of said pressing members being provided with a recess opening into the said chamber and adapted before it is sealed to receive a collapsed airbag or its equivalent, and to maintain it in its collapsed condition, and mechanism operable to collapse said airbag and position it within said recess before the chamber is sealed and later after the chamber is sealed to eject the airbag from the recess and allow it to expand into the shaped tire.

20. A combined tire-shaping and airbag-inserting machine including, in combination, means for engaging the beads of a flat-built tire casing, means adjacent thereto for collapsing an airbag or its equivalent to a dimension smaller than the bead diameter of the tire casing, means for pneumatically shaping the tire casing, and means for moving the collapsed airbag from the position of collapsing to a position within the tire casing.

21. A machine of the class described including, in combination, means for supporting a "flat-built" tire casing, means for collapsing an airbag or its equivalent at one side of the casing, means for shaping the supported tire casing, and means for moving the collapsed airbag from the position of collapsing, inserting the airbag into the tire casing and permitting it to expand therein.

22. A machine of the class described including, in combination, means for shaping and holding shaped a "flat-built" tire casing, means for distorting an annular resilient tire-shape-retaining member for admission within the inner circumference of the shaped casing, and means for moving the distorted member from the position of distorting and introducing said member within the casing, wherein it may return to its normal annular form.

23. A machine of the class described including, in combination, means for expanding the tread portion of a "flat-built" tire casing, means for contracting a tire-shape-retaining member outside of the plane of the casing, and means for moving the contracted member from the position of contracting and inserting said member into the tire casing.

24. A machine of the class described comprising means for engaging the opposing beads of a tire casing, means cooperating therewith for changing the cross-sectional shape of the tire casing, means for collapsing an airbag to a dimension smaller than the bead diameter of the casing, and means for moving the collapsed airbag from the position of collapsing to a position within the tire casing.

25. A machine of the class described comprising means for supporting a tire casing, means cooperating therewith for changing the cross-sectional shape of the tire casing, and mechanism for distorting a shape-retaining member in a position without and conducting it to a position within the tire casing.

BEST AVAILABLE COPY

26. A machine of the class described including, in combination, means for supporting one marginal portion of a "flat-built" tire casing and cooperating therewith to form a portion of a fluid-tight chamber, means for forming the remainder of the fluid-tight chamber including a holder cooperating to support the other marginal portion of the casing, means for creating within said chamber super-atmospheric pressure sufficient to shape the tire casing, and mechanism for introducing an airbag or its equivalent into a collapsed position within said holder and later transferring it therefrom into the shaped casing.

27. A machine of the class described including, in combination, means for supporting one marginal portion of a "flat-built" tire casing and cooperating therewith to form a portion of a fluid-tight chamber, means for forming the remainder of the fluid-tight chamber including a holder at one side of the tire casing cooperating to support the other marginal portion of the casing, means for creating within said chamber super-atmospheric pressure sufficient to shape the tire casing, and mechanism for introducing an airbag or its equivalent into a collapsed position within said holder and later transferring it therefrom into the shaped casing through one side thereof.

28. A device for inserting an airbag into a pneumatic tire casing comprising a movable head having a flange adapted to engage one bead of the casing, a cylinder positioned in axial alinement with the head and having a flange adapted to engage the other bead of the casing, a piston movable within the cylinder, pneumatic means for collapsing the airbag before it is advanced by the piston, and means for reciprocating the piston whereby to advance the airbag to a position within the inner periphery of the casing.

29. An airbag inserting device comprising a movable head having means adapted to seal one bead of a pneumatic tire casing, a cylinder having means adapted to seal the other bead of the casing, means for admitting compressed fluid into the cylinder, and means for collapsing and advancing an airbag to a position within the inner periphery of the casing.

30. An airbag inserting machine comprising a movable head having a flange adapted to engage one bead of a pneumatic tire casing, a cylinder having a flange adapted to engage the other bead of the casing, means for admitting compressed air into the cylinder, means for collapsing the airbag so that it may be inserted within the cylinder, and means for advancing the collapsed airbag from the position of collapsing to a position within the inner periphery of the casing.

31. A device for inserting an airbag within a pneumatic tire casing comprising a movable head having a flange adapted to engage one bead of the casing, a cylinder positioned in axial alinement with the head and having a flange adapted to engage the other bead of the casing, a piston reciprocable in the cylinder and adapted to be withdrawn from the end of the latter to permit the airbag to be inserted within the cylinder, and means for operating the piston.

32. A device for inserting an airbag into a pneumatic tire casing comprising a cylinder having a piston therein, a piston rod secured to the piston and extending outwardly from the cylinder, a movable head secured to the piston rod and having a flange adapted to engage one bead of the casing, a second cylinder having both of its ends open positioned in axial alinement with the movable head, a piston head operable within the second cylinder and adapted to be withdrawn therefrom to permit the insertion of the airbag into the second cylinder, means for collapsing the airbag before it is inserted in the latter cylinder, and means for moving the piston head.

33. A device for inserting an airbag into a pneumatic tire casing comprising a cylinder having a flange at one end adapted to engage a bead of the casing, an airbag collapsing mechanism positioned adjacent the other end of the cylinder, and means for advancing a collapsed airbag from the collapsing mechanism through the cylinder to a position within the inner periphery of the tire casing.

34. In a tire shaping apparatus, the combination with members adapted to make substantially fluid tight joints with the outer peripheries of the beads of a flat endless tire band and to form therewith a drum shaped chamber, one of which members at least is adapted to be moved towards and away from the other, of means for holding an inflatable bag in a confined position during the relative movement of said members while shaping said band, and means for releasing said bag from the holding means and thereby nesting it within a shaped endless tire band to sustain it in shape before and after removal from the apparatus.

35. In a tire shaping apparatus, the combination with a pair of platens adapted to make substantially fluid tight joints with the outer peripheries of the beads of a flat endless tire band and to form therewith a drum shaped chamber, one of which platens at least is adapted to move towards and away from the other, of means for holding an inflatable bag in a confined position during the relative movement of said platens while shaping said band and for releasing the bag and nesting it within the shaped endless tire band to sustain the latter in shape before and after removal of the band from the apparatus.

36. In a tire shaping apparatus, the com-

BEST AVAILABLE COPY bination with a pair of platens adapted to make substantially fluid tight joints with the outer peripheries of the beads of a flat endless tire band and to form therewith a drum shaped chamber, one of which platens at least is adapted to be moved towards and away from the other, of circular means provided in one of the platens for holding an inflatable bag in a collapsed position during the relative movement of said platens while shaping said band, and means for releasing said bag in position to nest within the resulting shaped endless tire band before the band is removed from the platens and for removal therewith.

37. In a tire shaping apparatus, the combination with a pair of relatively movable means adapted to make substantially fluid tight joints with the outer peripheries of the beads of a flat endless tire band, one of said means being provided with a space for releasably holding a detached collapsed air bag, means for causing relative movement between said band engaging means to at least in part shape a tire band disposed therebetween, and means for moving said air bag in a direction substantially parallel to the direction of movement of one of said platens from said holding space into position to nest with the shaped tire band.

38. In a tire shaping apparatus, the combination with a pair of relatively movable means adapted to make substantially fluid tight joints with the outer peripheries of the beads of a flat endless tire band, one of said means being provided with a space communicating with the space between said relatively movable means and within said band for releasably holding a detached collapsed air bag, means for causing relative movement between said band engaging means to at least in part shape a tire band disposed therebetween, and means for moving said air bag from said holding space into position to nest with the shaped tire band, said last mentioned means being movable axially of said tire band.

39. In a tire shaping apparatus, the combination with a pair of relatively movable means adapted to make substantially fluid tight joints with the outer peripheries of the beads of a flat endless tire band, one of said means being provided with a space communicating with the space between said relatively movable means and within said band for releasably holding a detached collapsed air bag, means for causing relative movement between said band engaging means to at least in part shape a tire band disposed therebetween, and means for pushing said air bag from said storage space into position to nest with the shaped tire band.

40. In a tire shaping apparatus, the combination of relatively movable pressing members adapted to make substantially fluid-tight joints with the outer peripheries of the beads of a substantially flat endless tire band and to form therewith a substantially hermetically sealed chamber, one of said pressing members being provided with a recess opening into said chamber adapted to receive a bag and to maintain around said bag the tire shaping pressure of said chamber, and means for transferring said bag from said recess into said chamber.

41. In a tire shaping apparatus, the combination of relatively movable pressing members adapted to make substantially fluid-tight joints with the outer peripheries of the beads of a substantially flat endless tire band and to form therewith a substantially hermetically sealed chamber, one of said pressing members being provided with a recess opening into said chamber adapted to receive a detached bag and to maintain the bag in a collapsed condition, and means for transferring said bag from said recess into said chamber.

ROBERT W. SNYDER.